US008411119B2

(12) United States Patent
Tsuchiya et al.

(10) Patent No.: US 8,411,119 B2

(45) Date of Patent: Apr. 2, 2013

(54) PRINTER MODULE INCLUDING MOVABLE BLADE MODULE AND FIXED BLADE MODULE

(75) Inventors: Masahiro Tsuchiya, Shinagawa (JP); Yukihiro Mori, Shinagawa (JP); Sumio Watanabe, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 387 days.

(21) Appl. No.: 12/503,117

(22) Filed: Jul. 15, 2009

(65) Prior Publication Data

US 2010/0188470 A1 Jul. 29, 2010

(30) Foreign Application Priority Data

Jan. 28, 2009 (JP) ................................ 2009-016443

(51) Int. Cl.

| | |
|---|---|
| ***B41J 2/385*** | (2006.01) |
| ***G03G 9/08*** | (2006.01) |
| *B41J 2/325* | (2006.01) |
| *B41J 11/00* | (2006.01) |
| *G01D 15/10* | (2006.01) |
| *B26D 3/00* | (2006.01) |
| *B23D 21/14* | (2006.01) |

(52) U.S. Cl. ............ 347/157; 347/222; 400/621; 83/42; 83/184

(58) Field of Classification Search .................. 347/157, 347/222; 400/621; 83/42, 184

See application file for complete search history.

(56) References Cited

U.S. PATENT DOCUMENTS

| | | | | |
|---|---|---|---|---|
| 6,361,231 | B1 * | 3/2002 | Sato et al. | 400/621 |
| 6,758,614 | B2 * | 7/2004 | Yamada et al. | 400/58 |
| 6,814,516 | B2 * | 11/2004 | Tsuchiya et al. | 400/621 |
| 7,059,793 | B2 * | 6/2006 | Mori et al. | 400/621 |
| 7,267,500 | B2 * | 9/2007 | Tsuchiya et al. | 400/621 |
| 7,273,325 | B2 * | 9/2007 | Watanabe et al. | 400/621 |
| 7,857,534 | B2 * | 12/2010 | Watanabe et al. | 400/621 |
| 7,876,346 | B2 * | 1/2011 | Watanabe et al. | 347/222 |

FOREIGN PATENT DOCUMENTS

| | | |
|---|---|---|
| JP | 2005-081774 | 3/2005 |

* cited by examiner

*Primary Examiner* — Laura Martin

*Assistant Examiner* — Jeremy Bishop

(74) *Attorney, Agent, or Firm* — IPUSA, PLLC

(57) ABSTRACT

A printer module for use in a printer apparatus having a rotationally openable lid includes a fixed blade module having a fixed blade, a movable blade module having a movable blade and configured to be joined to the fixed blade module such that the movable blade and the fixed blade face each other, and a positioning unit configured to position the movable blade module relative to the fixed blade module such that an angle between the movable blade and the fixed blade becomes optimum upon joining the movable blade module to the fixed blade module, wherein the movable blade module is configured to be movable relative to the rotationally openable lid upon being mounted on the rotationally openable lid of the printer apparatus.

7 Claims, 21 Drawing Sheets

PRINTER MODULE INCLUDING MOVABLE BLADE MODULE AND FIXED BLADE MODULE

BACKGROUND OF THE INVENTION

1. Field of the Invention

The disclosures herein generally relate to printer modules, and particularly relate to a printer module for use in a clamshell-type printer apparatus wherein the printer module includes two modules that are combined to form a cutter unit having a movable blade and a fixed blade facing each other.

2. Description of the Related Art

A clamshell-type printer apparatus has an openable lid and a main body having respective modules attached thereto, which are joined together upon the rotational closing motion of the openable lid.

A description will be given of a cutter unit having a movable blade and a fixed blade facing each other in a printer module for use in the clamshell-type printer apparatus.

FIG. 1 is a drawing illustrating a typical cutter apparatus 11 of a thermal printer module 10 having a movable blade module 15 and a fixed blade module 12 joined together. X1-X2 represents the width direction of the thermal printer module 10. Y1-Y2 represents a direction along which the fixed blade module 12 and the movable blade module 15 are arranged. Z1-Z2 represents the height direction of the thermal printer module 10.

The fixed blade module 12 has a fixed blade 13, and the movable blade module 15 has a movable blade 16 that is movable in the Y1-Y2 direction.

In the cutter apparatus 11, the edge of the movable blade 16 is in contact with the edge of the fixed blade 13 on the Z1 side thereof when the movable blade module 15 is joined to the fixed blade module 12. Movement of the movable blade 16 in the Y2 direction serves to cut a sheet by functioning like a scissors.

In FIG. 2B, the movable blade 16 is placed at a desirable angle $\theta 0$ relative to the fixed blade 13.

When the angle is $\theta 1$ ($>\theta 0$) as shown in FIG. 2A, the cutter apparatus has a short lifetime due to the high abrasion of the fixed blade 13 and the movable blade 16.

Conversely, when the angle is $\theta 2$ ($<\theta 0$) as shown in FIG. 2C, the plunging power of the movable blade 16 into a sheet is weak, thereby providing a blunt cutter.

FIGS. 3A through 3C are drawings illustrating a related-art thermal printer module 20. FIGS. 4A through 4C are drawings showing the way a cutter unit 21 is formed in the thermal printer module 20. FIGS. 5A and 5B are drawings illustrating a thermal printer apparatus 40 in which the thermal printer module 20 is embedded. FIG. 3A, FIG. 4A, and FIG. 5A correspond to each other, and FIG. 3B and FIG. 4B correspond to each other. Further, FIG. 3C, FIG. 4C, and FIG. 5B correspond to each other.

A fixed blade module 25 includes a fixed blade 26, a hook 28, and a thermal head 29 as shown in FIG. 3A. The fixed blade 26 is pushed upward by a plate spring 27 to assume a slanted position as shown in FIG. 4A.

A movable blade module 30 includes a movable blade 31 and a platen roller 32 as shown in FIG. 3A. The platen roller 32 has platen roller shaft parts 33 on its opposite ends.

The movable blade module 30 is brought closer to the fixed blade module 25 as indicated by an arrow in FIG. 3A, and, then, the platen roller shaft parts 33 engage the hook 28. As illustrated in FIG. 3B, the movable blade module 30 is joined to the fixed blade module 25 to form the thermal printer module 20. O1 indicates a joint point at which the platen roller shaft parts 33 engage the hook 28.

The platen roller 32 is pressed against the thermal head 29 to form a print unit 22. Further, the edge of the movable blade 31 is placed in contact with the edge of the fixed blade 26 on the Z1 side thereof, thereby forming the cutter unit 21.

The urging force of the plate spring 27 rotationally urges the movable blade module 30 around the center O1 in the counterclockwise direction indicated by an arrow CC. The fixed blade module 25 is rotationally urged in the clockwise direction as indicated by an arrow C.

The fixed blade module 25 and the movable blade module 30 are not specifically configured to regulate the above-noted rotational movement. The movable blade module 30 exhibits rotational movement until some portion thereof comes in contact with some portion of the fixed blade module 25, thereby settling in the state as shown in FIG. 3B. In this state, the movable blade 31 and fixed blade 26 of the cutter unit 21 form a chevron shape as shown in FIG. 4B. The angle between the movable blade 31 and the fixed blade 26 is $\theta 10$, which is significantly larger than $\theta 0$.

It should be noted that the thermal printer module 20 is placed in such a state that the movable blade module 30 can be rotationally moved in the direction indicated by the arrow C relative to the fixed blade module 25 by bending the plate spring 27.

As illustrated in FIG. 5B, the related-art thermal printer apparatus 40 has such a configuration that the thermal printer module 20 is mounted in an apparatus main body 41. The apparatus main body 41 includes a case 42 and a rotationally openable lid 50. The case 42 is a molded synthetic resin component.

As illustrated in FIG. 5A, the case 42 includes a paper roll container part 43 for storing a paper roll 80 and a mounting platform part 44 on which the fixed blade module 25 is mounted. Further, the case 42 includes a hinge bracket part 45 at an end of the paper roll container part 43.

The rotationally openable lid 50 includes a lid main body 51, a hinge bracket part 52, and a mounting platform part 53. The lid main body 51 has such a size as to cover the paper roll container part 43. The hinge bracket part 52 is provided at the base end of the lid main body 51. The mounting platform part 53 serves as a platform on which the movable blade module 30 is mounted.

The hinge bracket part 52 of the rotationally openable lid 50 is supported by the hinge bracket part 45 via a shaft 46. The rotationally openable lid 50 is opened and closed by rotating about the shaft 46.

The fixed blade module 25 is fixed to the mounting platform part 44 of the case 42 by threadable mounting. The fixed blade module 30 is fixed to the mounting platform part 53 of the rotationally openable lid 50 by threadable mounting.

The position of the mounting platform part 44 relative to the shaft 46 (as determined by measurement y10 and measurement z10) and the position of the mounting platform part 53 relative to the shaft 46 (as determined by measurement y11 and measurement z11) are arranged to provide the positional relationship as illustrated in FIG. 5B. Namely, when the rotationally openable lid 50 is closed by rotating clockwise, the movable blade module 30 is joined to the fixed blade module 25 in the positional relationship as illustrated in FIG. 3C With this positional relationship, the angle of the movable blade 31 relative to the fixed blade 26 in the cutter unit 21 is made equal to the optimum angle $\theta 0$ as illustrated in FIG. 4C.

Namely, the thermal printer apparatus 40 is configured such that the apparatus main body 41 controls an angle between the movable blade 31 and the fixed blade 26 in the cutter unit 21 of the thermal printer module 20.

As described above, the thermal printer apparatus 40 is configured such that the apparatus main body 41 controls an angle between the movable blade 31 and the fixed blade 26 in the cutter unit 21 of the thermal printer module 20. The above-noted angle of the cutter unit 21 is thus affected by the dimension errors of the case 42 and the rotationally openable lid 50, the positional error of the fixed blade module 25 mounted on the mounting platform part 44, the positional error of the movable blade module 30 mounted on the mounting platform part 53, etc. In some cases, the angle between the movable blade 31 and the fixed blade 26 in the cutter unit 21 may be set larger than or smaller than the desirable angle. In such a case, the short lifetime or blunt cutting of the cutter unit 21 becomes a problem as previously described.

The size of the thermal printer apparatus 40 has been reduced over the years, resulting in the length of the rotationally openable lid 50 being relatively short, i.e., the measurement y11 being relatively short. In such a case, the effect of the dimension errors and positional errors noted above on the angle of the cutter unit 21 becomes larger than in the case in which the length of the rotationally openable lid 50 is long.

Further, the movable blade module 30 is securely fixed to the mounting platform part 53. In order to ensure that the movable blade module 30 is smoothly joined to the fixed blade module 25, thus, the part in which the shaft 46 of the rotationally openable lid 50 is fit provides a loose fit to allow some movement of the shaft 46. There is thus a risk of having loose movements when the rotationally openable lid 50 is open.

Accordingly, it is preferable to provide a printer module and printer apparatus that eliminate the problems described above.

[Patent Document 1] Japanese Patent Application Publication No. 2005-081774

SUMMARY OF THE INVENTION

It is a general object of the present invention to provide a printer module and a printer apparatus that substantially eliminate one or more problems caused by the limitations and disadvantages of the related art.

According to one embodiment, a printer module for use in a printer apparatus having a rotationally openable lid includes a fixed blade module having a fixed blade, a movable blade module having a movable blade and configured to be joined to the fixed blade module such that the movable blade and the fixed blade face each other, and a positioning unit configured to position the movable blade module relative to the fixed blade module such that an angle between the movable blade and the fixed blade becomes optimum upon joining the movable blade module to the fixed blade module, wherein the movable blade module is configured to be movable relative to the rotationally openable lid upon being mounted on the rotationally openable lid of the printer apparatus.

According to another embodiment, a printer apparatus includes a case, a rotationally openable lid rotatably open and close with respect to the case, a fixed blade module having a fixed blade and mounted on the case, a movable blade module having a movable blade and mounted on the rotationally openable lid, the movable blade module configured to be joined to the fixed blade module upon closing the rotationally openable lid such that the movable blade and the fixed blade face each other, and a positioning unit configured to position the movable blade module relative to the fixed blade module such that an angle between the movable blade and the fixed blade becomes optimum upon joining the movable blade module to the fixed blade module, wherein the movable blade module mounted on the rotationally openable lid is configured to be movable relative to the rotationally openable lid.

According to at least one embodiment, the movable blade module and the fixed blade module are configured such that an angle between the movable blade and the fixed blade becomes optimum upon joining the movable blade module to the fixed blade module. Further, the movable blade module is configured to be slightly movable when the movable blade module is mounted on the rotationally openable lid of the thermal printer apparatus. With this arrangement, the dimension error of the thermal printer apparatus, the positional error of the movable blade module upon being mounted, and the positional error of the fixed blade module upon being mounted do not affect the angle between the movable blade and the fixed blade in the cutter apparatus. Reliability can thus be improved.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments for carrying out the present invention will be described by referring to the accompanying drawings.

First Embodiment

Figure 6:
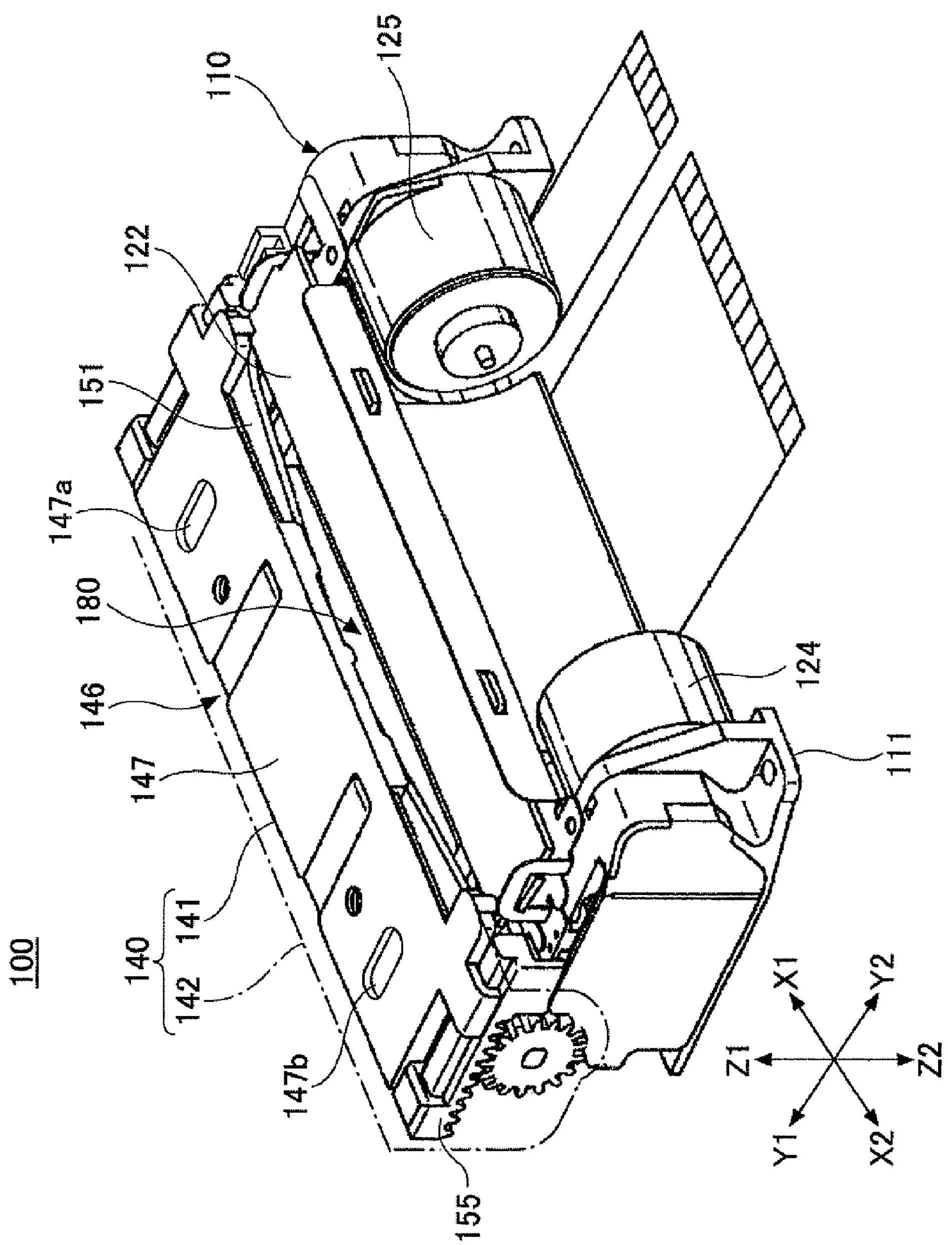
FIG. 6 is a perspective view of a thermal printer module according to a first embodiment of the present invention.
Figure 7:
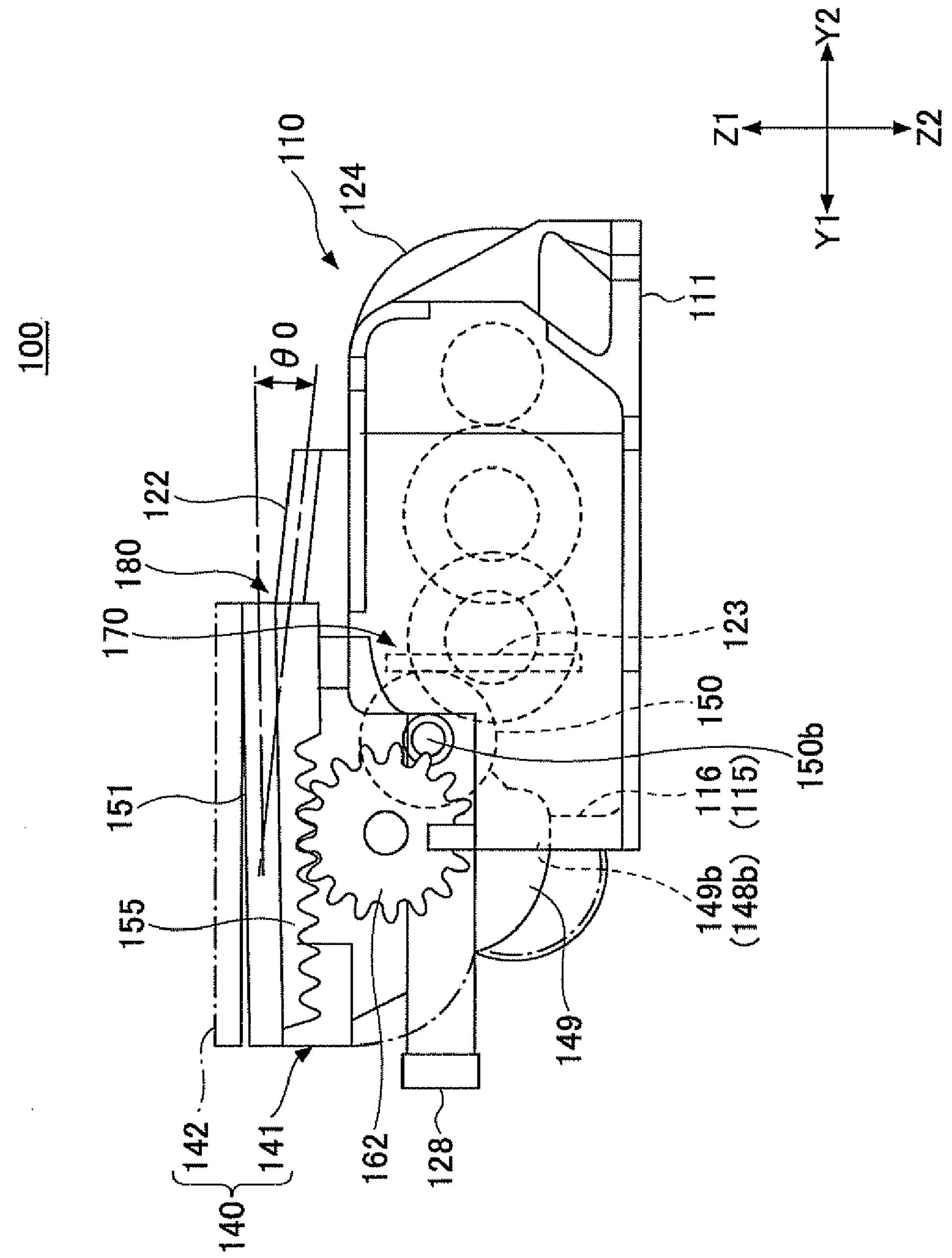
FIG. 7 is a side elevation view of the thermal printer module illustrated in FIG. 6.

FIG. 6 is a perspective view of a thermal printer module 100 according to a first embodiment of the present invention. FIG. 7 is a side elevation view of the thermal printer module 100 illustrated in FIG. 6.

Figure 8:
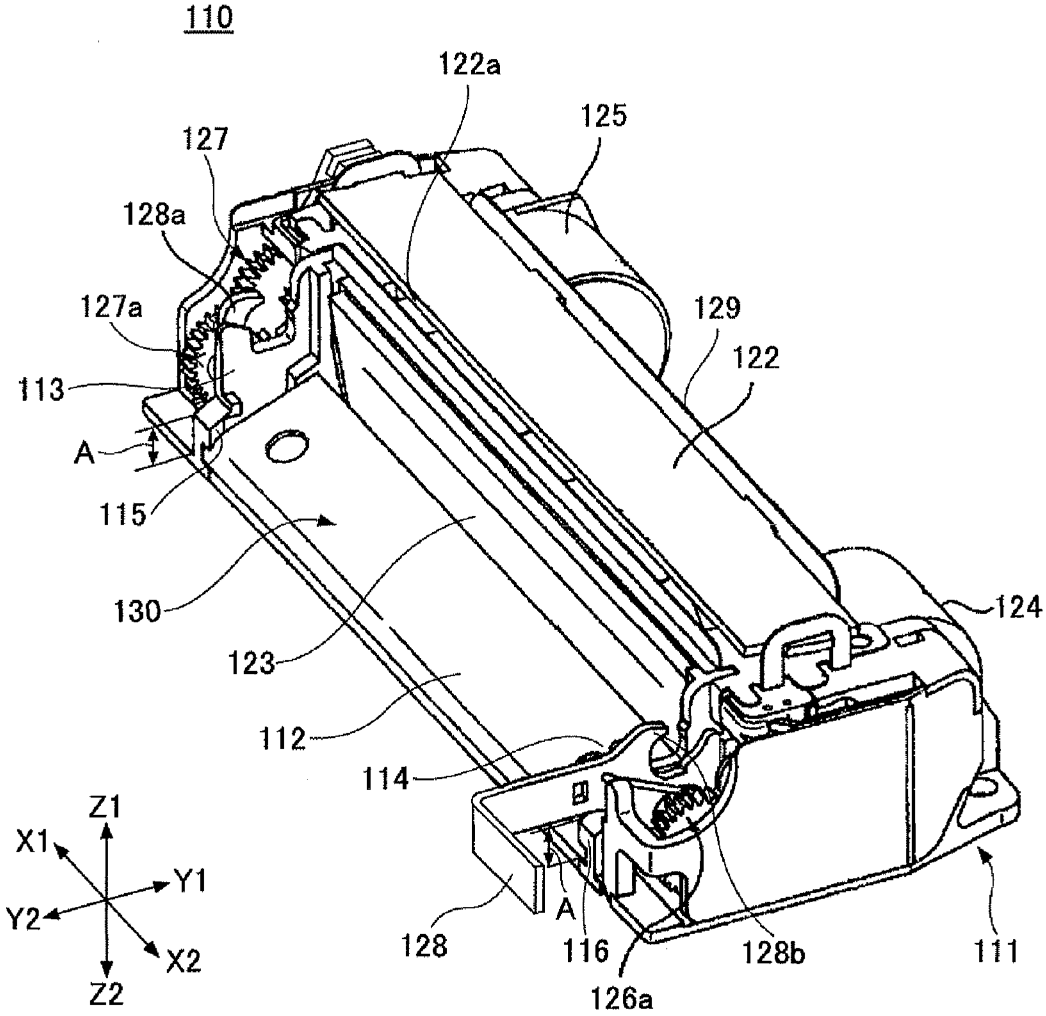
FIG. 8 is a perspective view of a fixed blade module.
Figure 9:
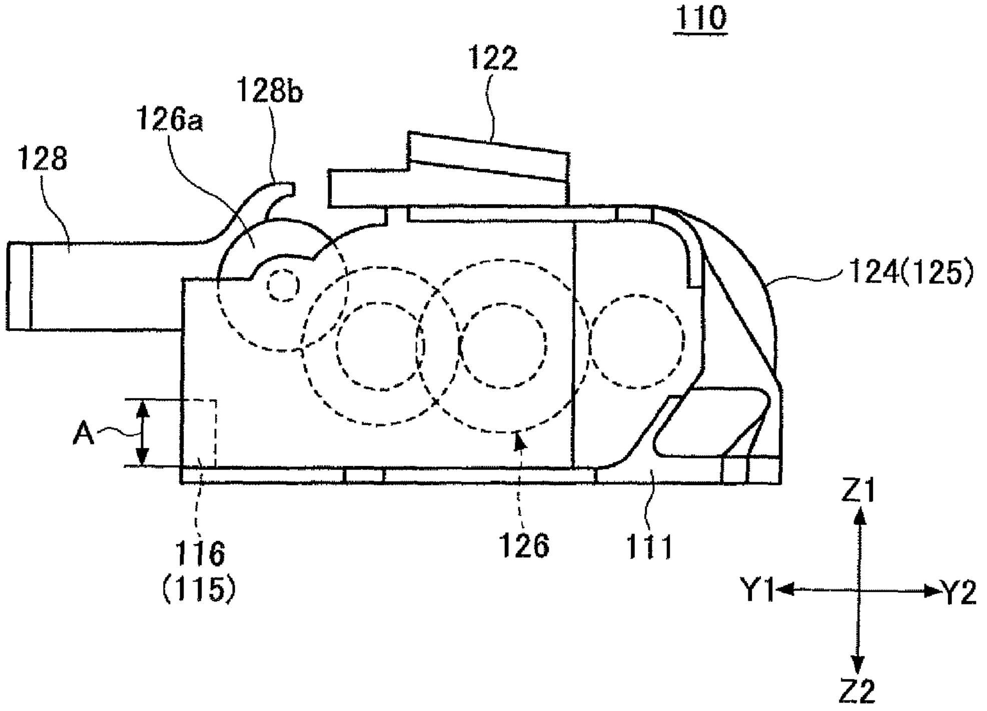
FIG. 9 is a side elevation view of the fixed blade module.
Figure 11:
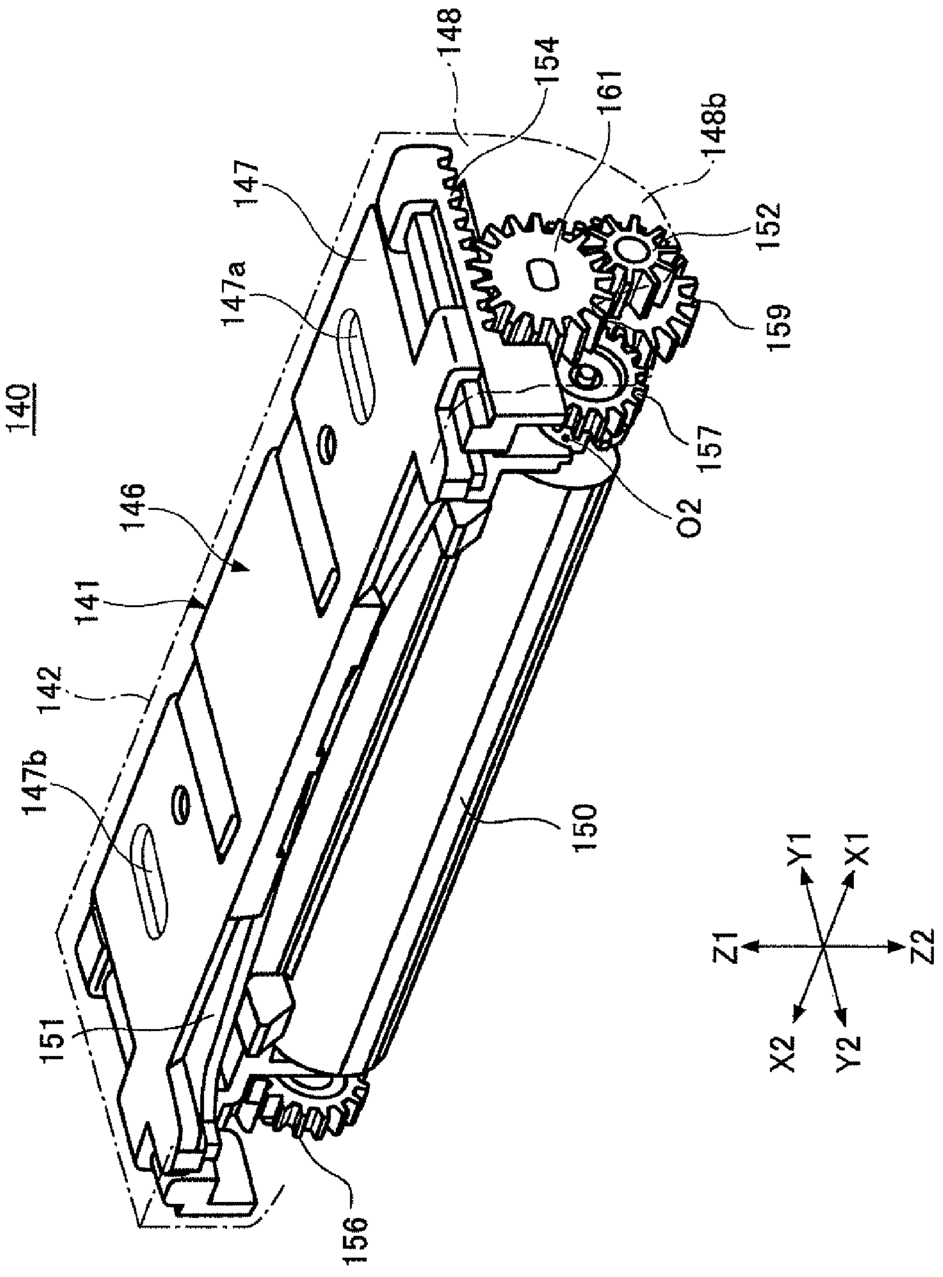
FIG. 11 is a perspective view of a movable blade module.

The thermal printer module 100 is configured such that a movable blade module 140 illustrated in FIG. 11 is joined in a separable manner to a fixed blade module 110 illustrated in FIG. 8 and FIG. 9. This configuration is used in a clamshell-type thermal printer apparatus.

[Thermal Printer Module 100]

As illustrated in FIG. 8 and FIG. 9, the fixed blade module 110 includes a fixed blade module frame 111 that is a zinc die-cast component. The fixed blade module 110 further includes a fixed blade 122, a thermal head 123, a paper shifting pulse motor 124, a cutter-unit pulse motor 125, first and second speed reduction gear series 126 and 127, and a platen roller lock member 128, which are mounted on the fixed blade module frame 111.

The fixed blade module frame 111 includes a bottom plate 112 having a long side extending in the X1-X2 direction, side plates 113 and 114 disposed at the opposite ends of the bottom plate 112 to face each other, and locking parts 115 and 116.

Figure 10:
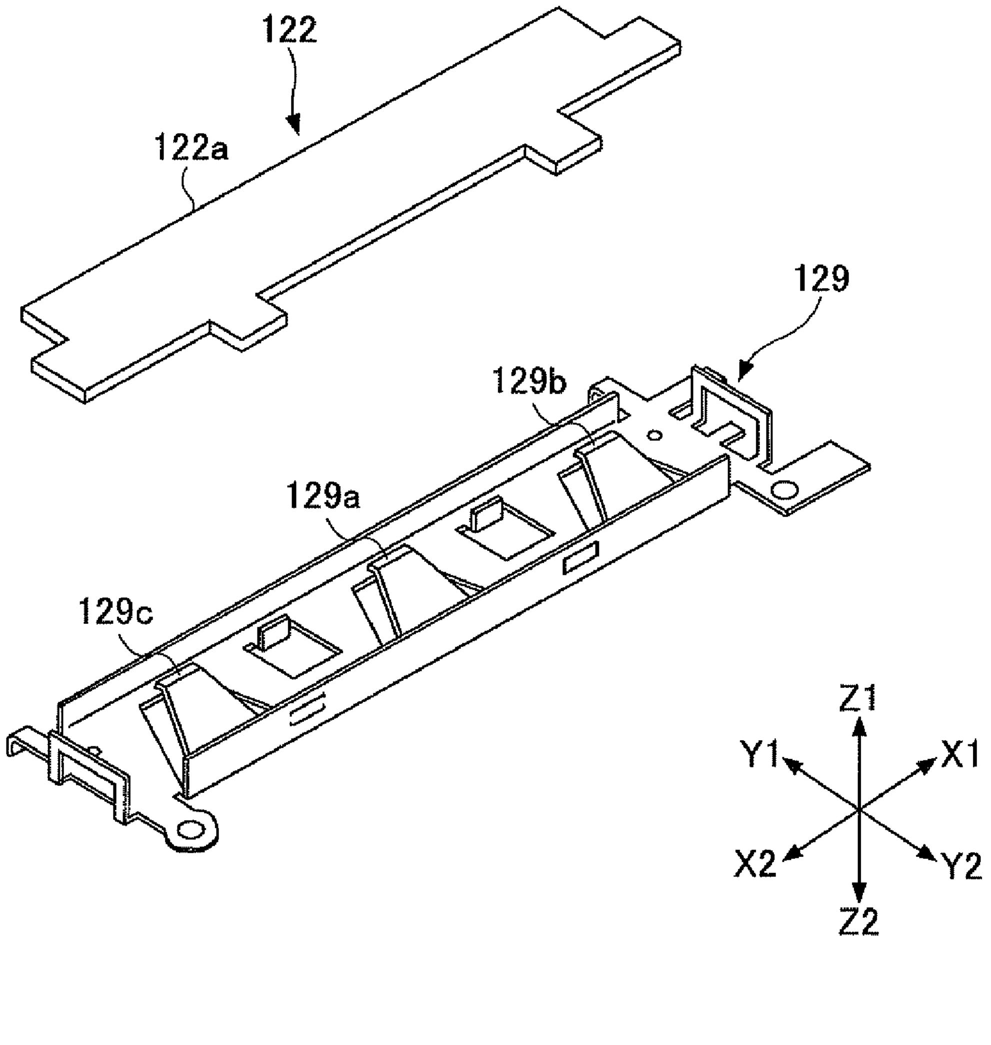
FIG. 10 is an exploded view of a fixed blade and a supporting member.

As illustrated in FIG. 10, the fixed blade 122 is mounted on a support member 129. The support member 129 is fixed to the upper surface of the frame 111. The fixed blade 122 is pushed upward in the Z1 direction by plate springs **129*a*, 129*b*, and 129*c*, so that a blade edge 122*a*** is slightly slanted toward the Z1 side.

The platen roller lock member 128 has hook parts **128*a* and 128*b* at the opposite ends of the fixed blade module 110. The platen roller lock member 128** is manually operable.

As shown in FIG. 8, the fixed blade module 110 has a container part 130 on the Y2 side. The container part 130 accommodates part of a frame and platen roller of the movable blade module 140. The container part 130 is defined by the bottom plate 112, the side plates 113 and 114, and the thermal head 123.

The locking parts 115 and 116 are formed on the side plates 113 and 114 close to the Y2 end. The locking parts 115 and 116 are elevated from the bottom plate 112 by a measurement A toward the Z1 side, and also project inwardly toward the center of the container part 130.

The locking parts 115 and 116 and bulging portions, which will be described later, constitute a positioning unit.

[Movable Blade Module 140]

Figure 12:
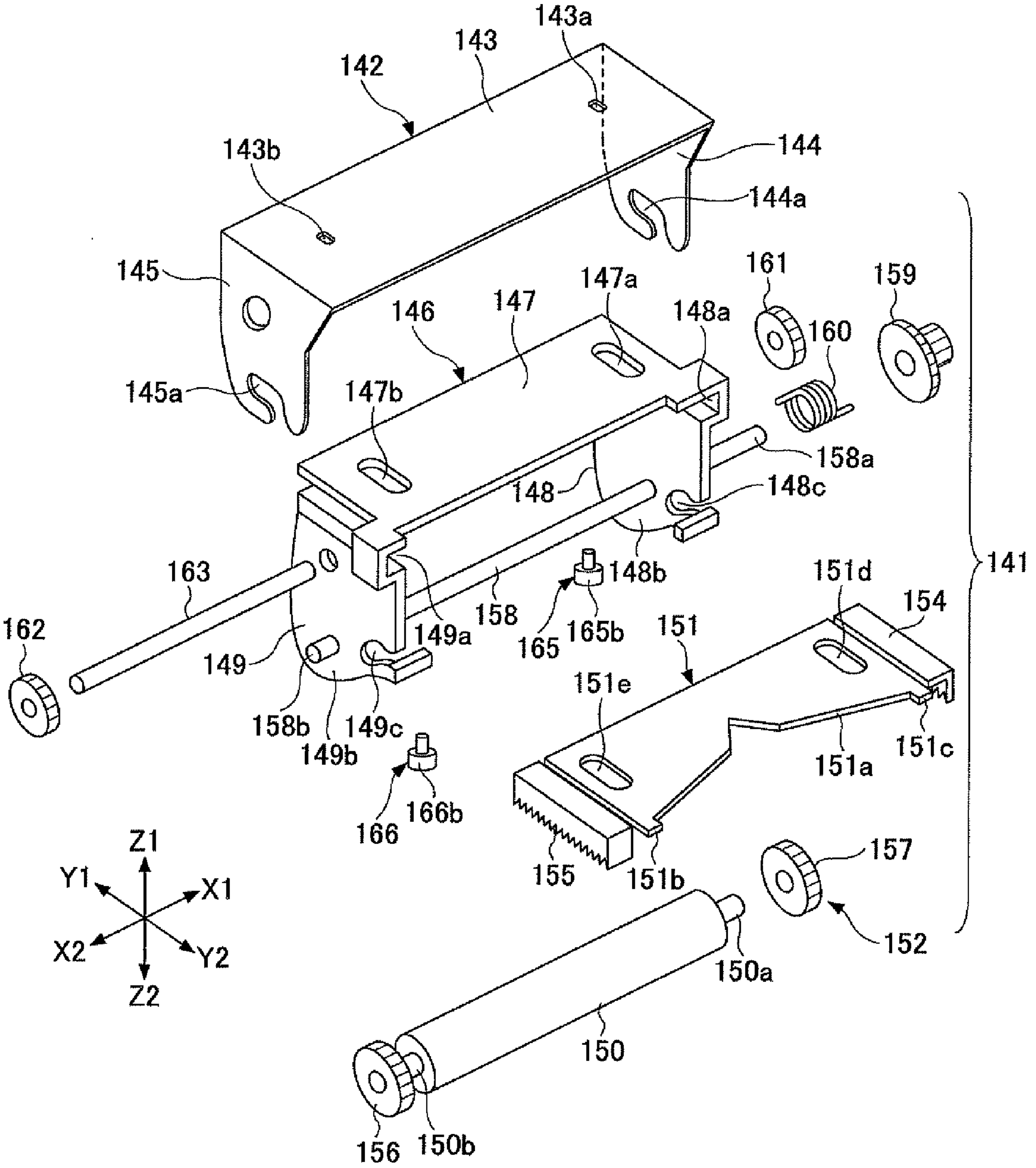
FIG. 12 is an exploded perspective view of the movable blade module.
Figure 13:
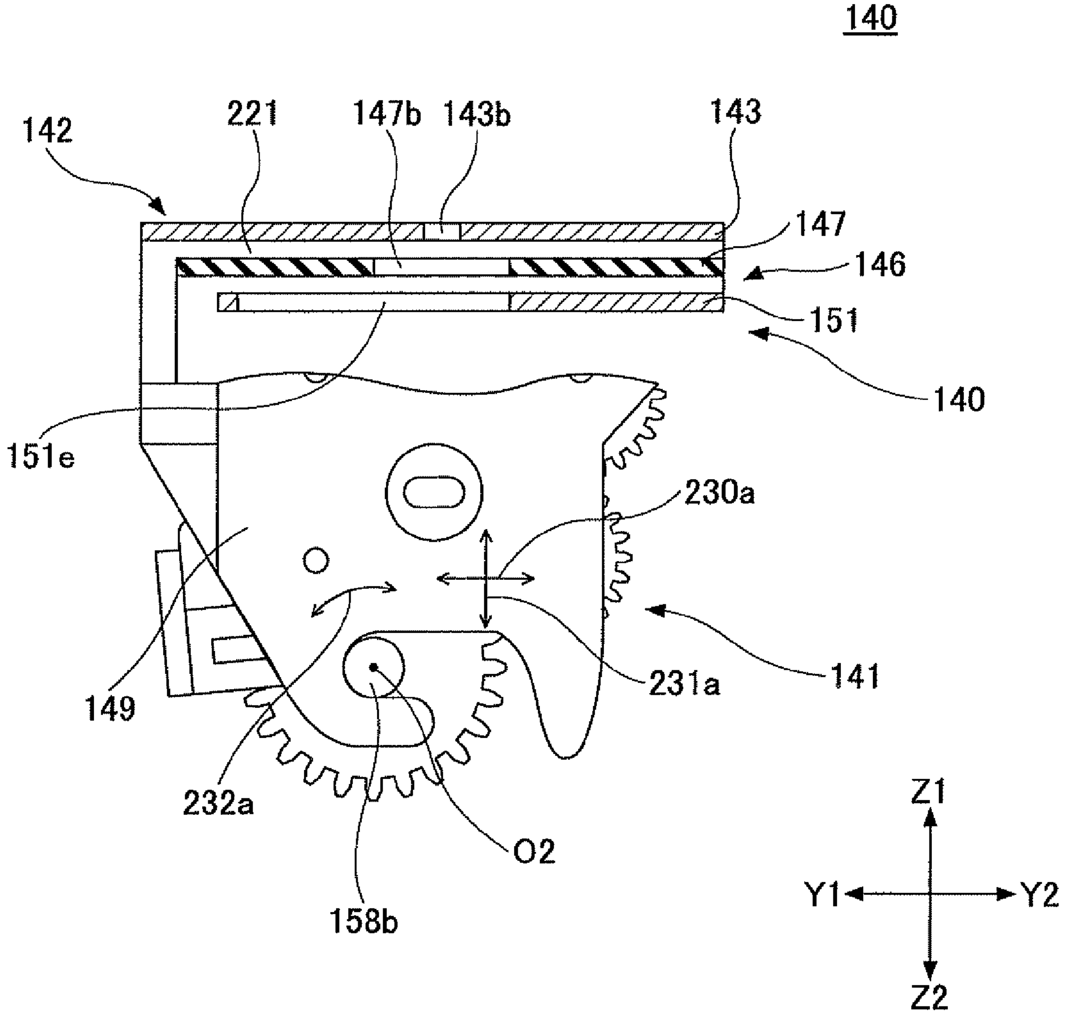
FIG. 13 is a partial cross-sectional view of the movable blade module.

FIG. 11 is a drawing illustrating the movable blade module 140 without its cover member. FIG. 12 is an exploded view of the movable blade module 140. FIG. 13 is a partial cross-sectional view of the movable blade module 140.

The movable blade module 140 includes a cover member 142 and a movable blade module main body 141 covered by the cover member 142, as best illustrated in FIG. 13.

The movable blade module main body 141 is configured such that a platen roller 150, a movable blade 151, and a gear series 152 are mounted to a movable blade module frame 146, as best illustrated in FIG. 11. The cover member 142 is attached to the movable blade module main body 141 to cover the upper and lateral sides of the movable blade module main body 141.

The frame 146 is made of synthetic resin. The frame 146 has a top plate 147 and flange parts 148 and 149 provided at the opposite ends of the top plate 147 to form a U-letter shape as best illustrated in FIG. 12. The frame 146 has such a size that the flange parts 148 and 149 snugly fit inside the side plates 113 and 114 of the frame 111, and that the frame 146 fits inside the container part 130 of the fixed blade module 110.

Referring to FIG. 12, the top plate 147 has openings **147*a* and 147*b* formed therethrough that have a long side extending in the Y1-Y2 direction. The openings 147*a* and 147*b* have such a size that heads 165*b* and 166*b* of screws 165 and 166 can loosely fit in these openings. The openings 147*a* and 147*b* provide a gap 220 (see FIG. 18) as will be described later. The openings 147*a* and 147*b* cooperate with another gap 221 (see FIG. 18) to allow the movable blade module 140 to be rotationally movable within a small angular range when the movable blade module 140 is mounted to a rotationally openable lid which will be described later. The upper surface of the top plate 147 has a slide lip 147*c* formed thereon (see FIG. 19**).

The flange parts 148 and 149 have guide portions **148*a* and 149*a* at the Z1 end for guiding the movable blade 151, as best illustrated in FIG. 12. At the Z2 end, further, the flange parts 148 and 149 have bulging portions 148*b* and 149*b* and shaft receiving portions 148*c* and 149*c* for supporting the platen roller 150. The bulging portions 148*b* and 149*b* project toward the Z2 side, and come in contact with the locking parts 115 and 116 of the fixed blade module 110** as will be later described.

The movable blade 151 has a blade edge **151*a* formed in a V-letter shape, and also has arm portions 151*b* and 151*c* situated at the opposite ends of the blade edge 151*a*. Further, the movable blade 151 has elongated holes 151*d* and 151*e* extending in the Y1-Y2 direction situated near the X1 end and X2 end, respectively. The elongated holes 151*d* and 151*e* are provided for the purpose of allowing the movable blade 151 to move in the Y1-Y2 direction without having the heads 165*b* and 166*b* of the screws 165 and 166** blocking the movement.

A rack 154 is fixed to the movable blade 151 on the X1 side. A rack 155 is fixed to the movable blade 151 on the X2 side. The movable blade 151 is movable in the Y1-Y2 direction, with the rack 154 supported by the guide portion **148*b* and the rack 155 supported by the guide portion 149*a***.

The platen roller 150 has shaft portions **150*b* and 150*a* projecting from the opposite ends thereof. The shaft portions 150*a* and 150*b* are supported by the shaft receiving portions 148*c* and 149*c* of the flange parts 148 and 149, respectively. A gear 156 is fixed to the shaft portion 150*b*. A gear 157 is rotatably supported by the shaft portion 150*a***.

A fixed shaft member 158 is fixedly mounted to span between the flange parts 148 and 149. The fixed shaft member 158 has a shaft portion **158*a* projecting on the X1 side of the flange part 148, and has a shaft portion 158*b* projecting on the X2 side of the flange part 149**.

The shaft portion **158*a* supports a double-stage gear 159 and a spring 160. Further, a shaft member 163 is rotatably supported by the flange parts 148 and 149 to span therebetween. Pinions 161 and 162 are fixed to the opposite ends of the shaft member 163. The pinions 161 and 162 engage the racks 154 and 155, respectively. The double-stage gear 159 engages the gear 157 and the gear 161. Due to the spring 160 for providing a returning force in the Y1 direction, the movable blade 151 is generally in a retracted position inside the frame 146 (see FIG. 13). The gear 157, the double-stage gear 159, and the gear 161 together constitute the gear series 152**.

The cover member 142 is a metal plate. The cover member 142 has a top plate 143 and flange parts 144 and 145 provided at the opposite ends of the top plate 143 to form a U-letter shape. The cover member 142 has such a size as to cover the frame 146.

The top plate 143 has holes 143*a* and 143*b* formed therethrough at positions corresponding to the openings 147*a* and 147*b* of the top plate 147 of the frame 146, thereby allowing the passage of the screws 165 and 166.

The flange parts 144 and 145 have shaft receiving portions 144*a* and 145*a* having hook shapes, which loosely engage the shaft portions 158*a* and 158*b* of the fixed shaft member 158, respectively, for support purposes.

The cover member 142 covers the frame 146. The shaft receiving portions 144*a* and 145*a* loosely engage the shaft portions 158*a* and 158*b*, respectively. The gap 221 is provided between the top plate 143 and the top plate 147 as illustrated in FIG. 13.

In the movable blade module 140, the movable blade module main body 141 hangs from the cover member 142. Further, the movable blade module main body 141 is movable relative to the cover member 142 in the Y1-Y2 direction as indicated by an arrow 230*a* and in the Z1-Z2 direction as indicated by an arrow 231*a* as much as permitted by the gap 221. Further, the movable blade module main body 141 is rotationally movable about the position O2 of the shaft receiving portions 144*a* and 145*a* within a small angular range as indicated by an arrow 232*a*. With this arrangement, the movable blade module main body 141 can slightly move due to a loose fit relative to the cover member 142 in the movable blade module 140.

[Thermal Printer Module 100]

Figure 14A:
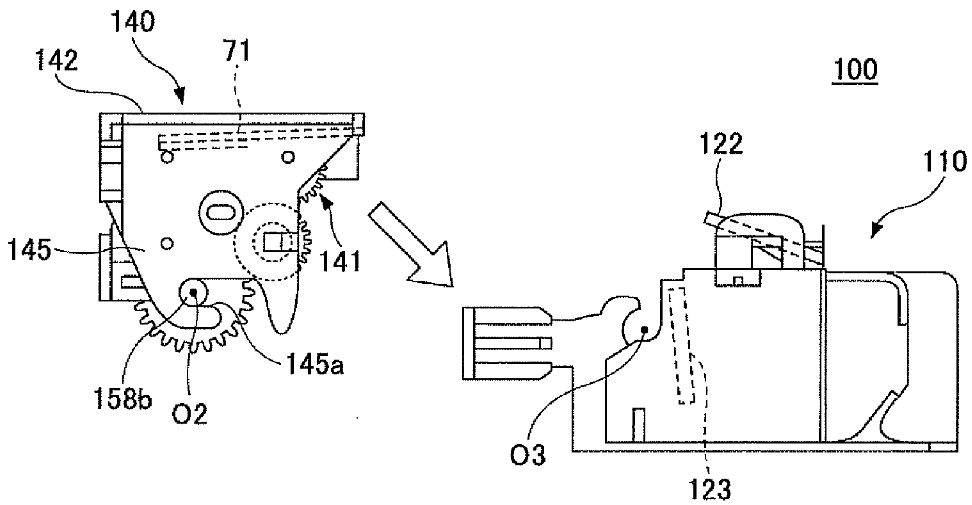
FIGS. 14A and 14B drawings illustrating the thermal printer module.
Figure 14B:
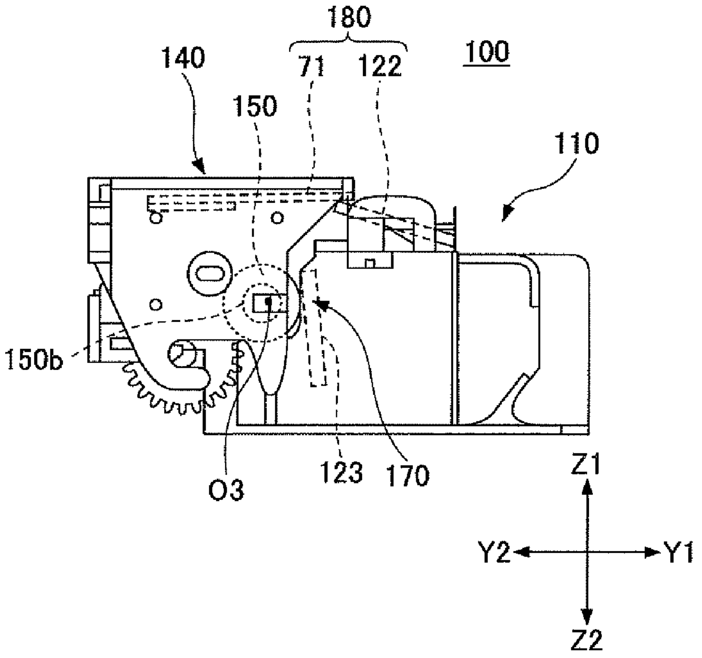

In the thermal printer module 100, the movable blade module 140 is brought closer to the fixed blade module 110 as indicated by an arrow in FIG. 14A. As illustrated in FIG. 14B, the shaft portions 150*a* and 150*b* of the platen roller 150 (see FIG. 12) engage the hook parts 128*a* and 128*b* of the platen roller lock member 128 (see FIG. 8), respectively. As a result, the movable blade module 140 is joined to the fixed blade module 110 in a separable manner.

The flange parts 148 and 149 (see FIG. 12) fit inside the side plates 113 and 114 (see FIG. 8), and the platen roller 150 is pressed against the thermal head 123 inside the container part 130, thereby forming a print unit 170. Further, the edge of the movable blade 151 is placed in contact with the edge of the fixed blade 122 on the Z1 side thereof, thereby forming a cutter unit 180. Moreover, the gear 157 (see FIG. 12) engages an end gear of the speed reduction gear series 127 (see FIG. 8), and the gear 156 (see FIG. 12) engages an end gear of the speed reduction gear series 126 (see FIG. 9).

Figure 1:
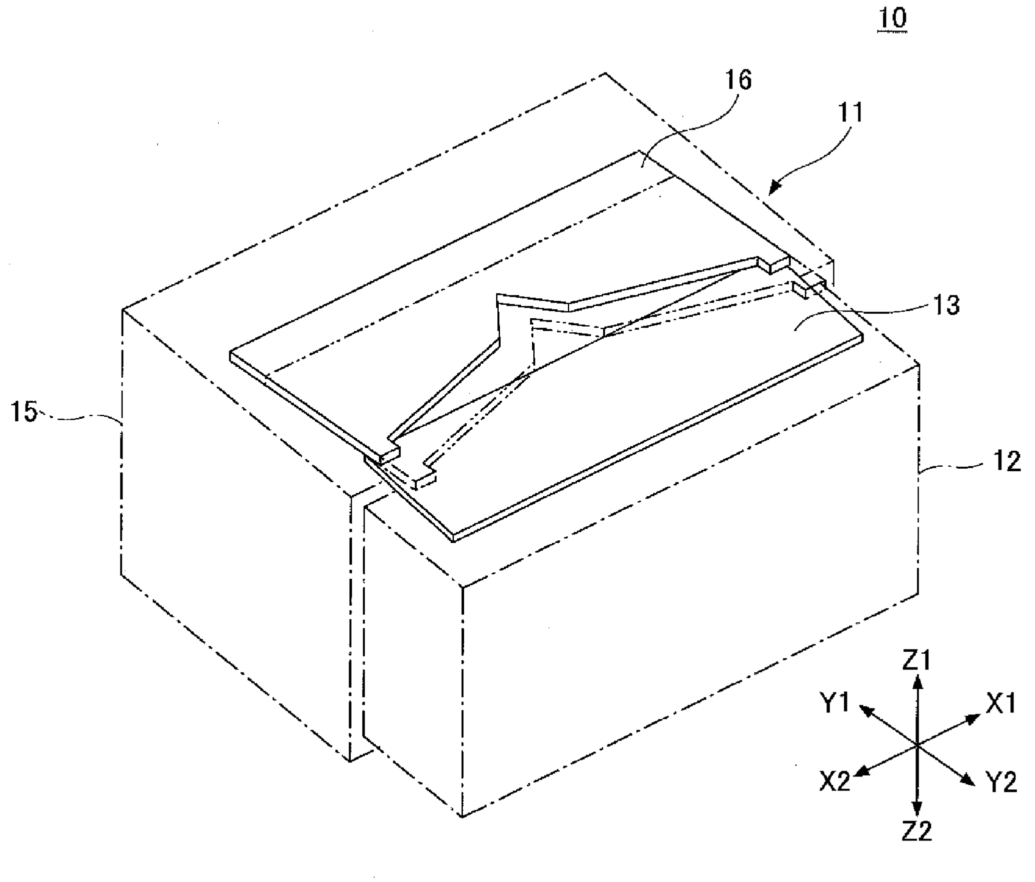
FIG.1 RELATED ART
FIG. 1 is a drawing illustrating a cutter unit of a typical thermal printer module.
Figure 2A:
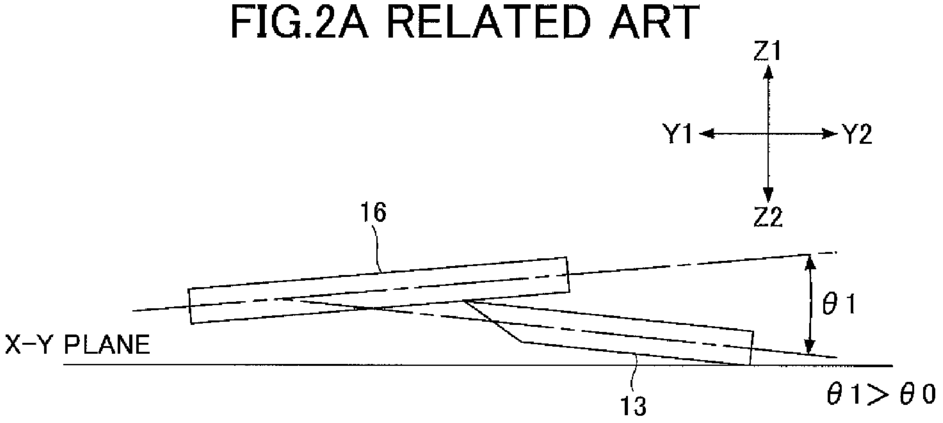
FIG.2A RELATED ART
FIGS. 2A through 2C are drawings illustrating angles between a movable blade and a fixed blade.
Figure 2B:
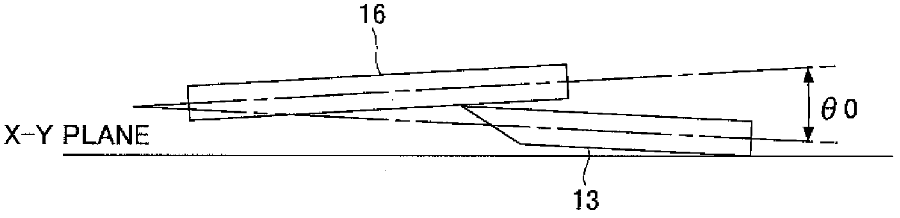
FIG.2B RELATED ART
Figure 2C:
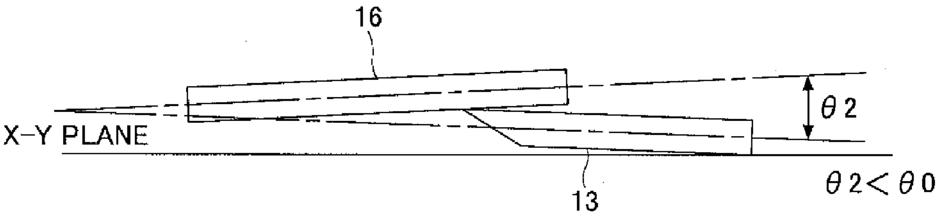
FIG.2C RELATED ART
Figure 3A:
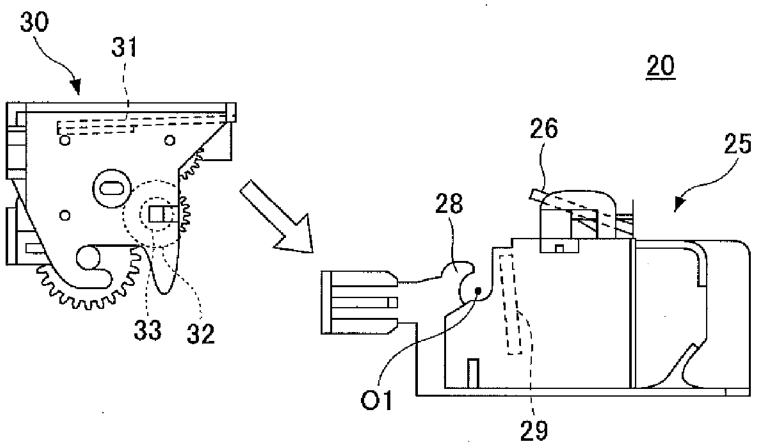
FIG.3A RELATED ART
FIGS. 3A through 3C are drawings illustrating a related-art thermal printer module.
Figure 3B:
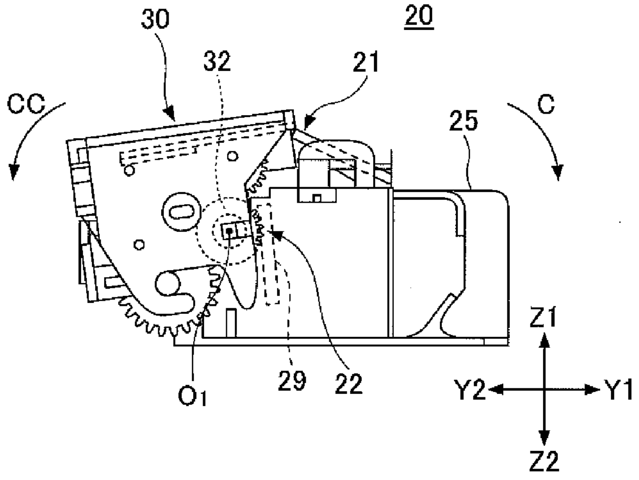
FIG.3B RELATED ART
Figure 3C:
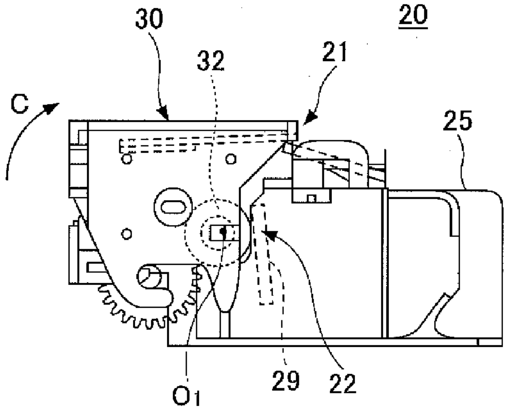
FIG.3C RELATED ART
Figure 4A:
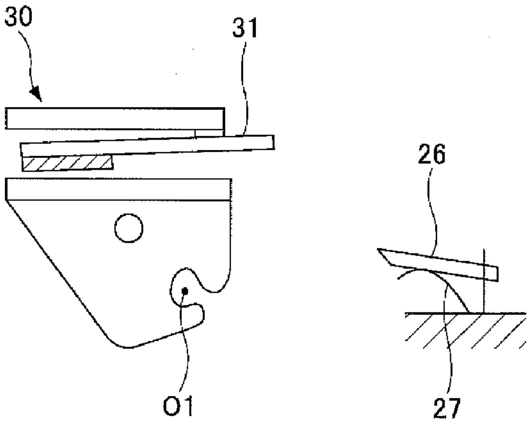
FIG.4A RELATED ART
FIGS. 4A through 4C are schematic drawings illustrating a cutter unit.
Figure 4B:
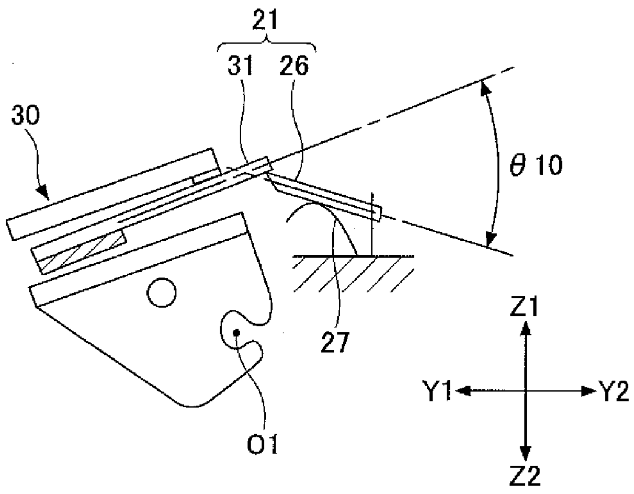
FIG.4B RELATED ART
Figure 4C:
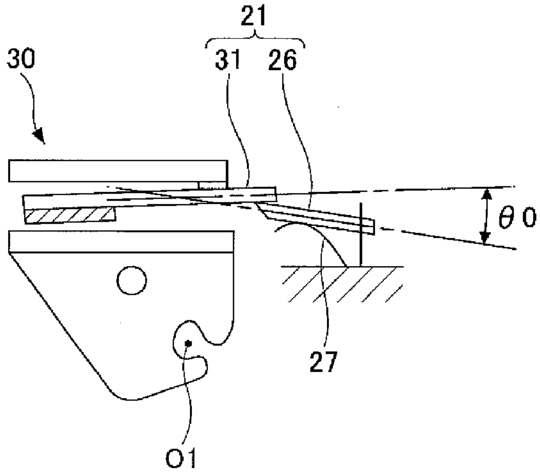
FIG.4C RELATED ART
Figure 5A:
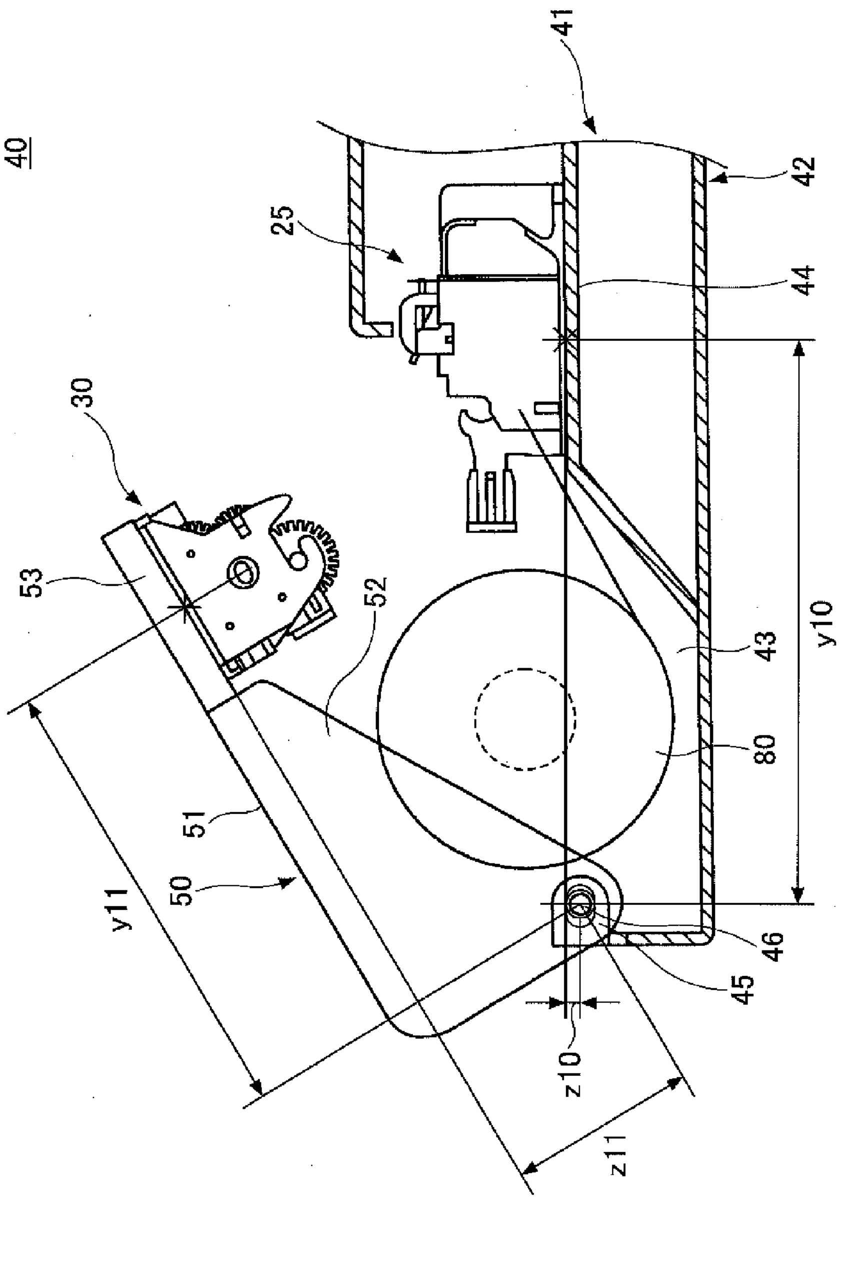
FIG.5A RELATED ART
FIGS. 5A and 5B are drawings illustrating a related-art thermal printer apparatus.
Figure 5B:
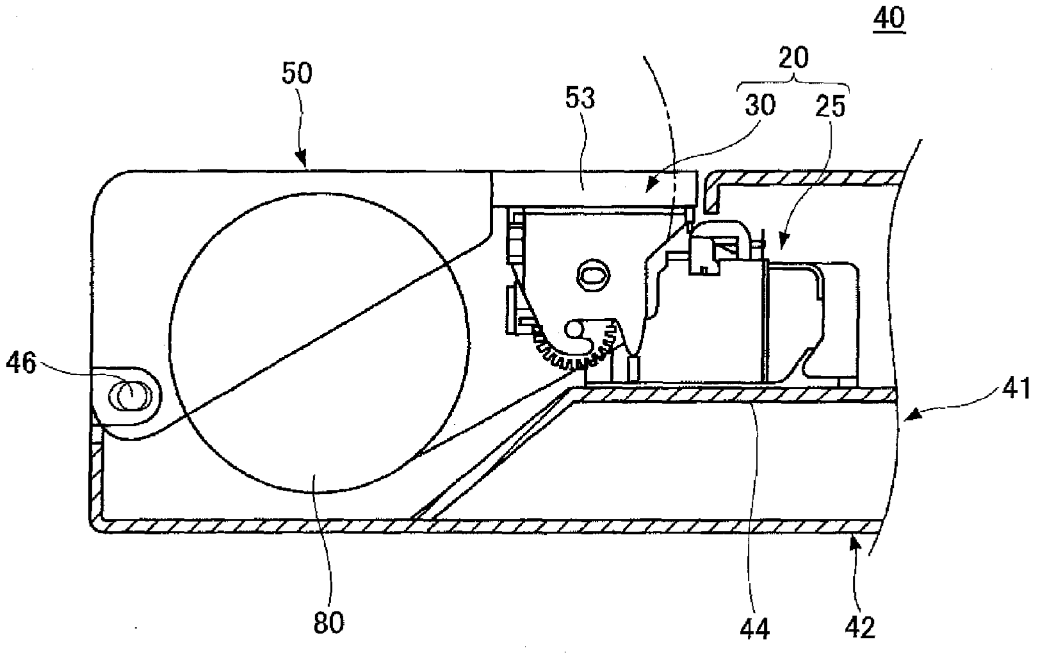
FIG.5B RELATED ART
Figure 15A:
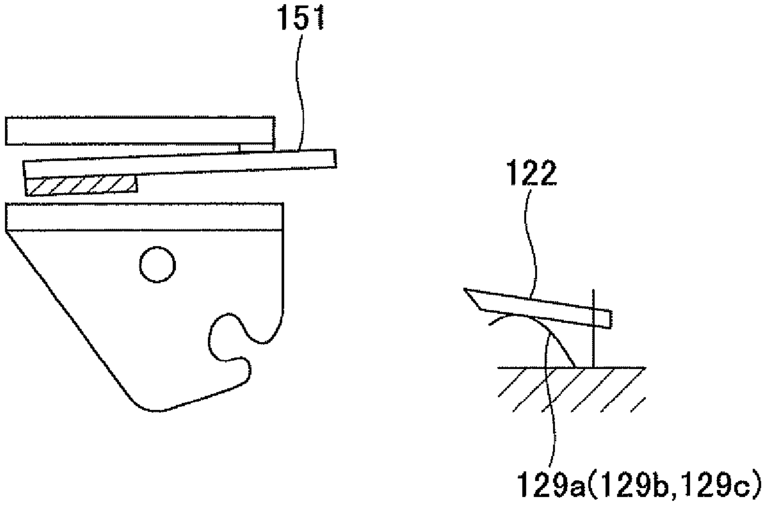
FIGS. 15A and 15B are schematic drawings illustrating a cutter unit.
Figure 15B:
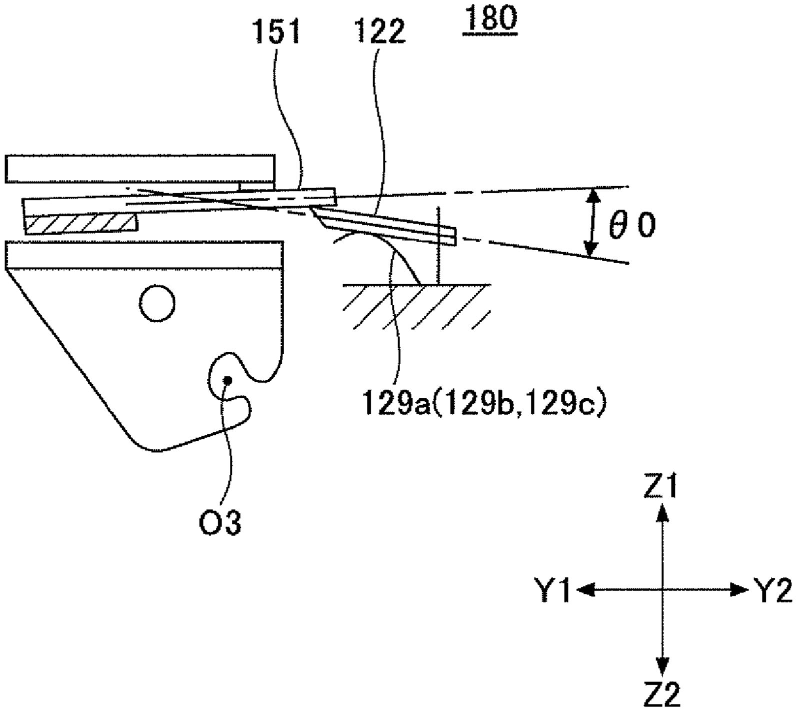

The bulging portions 148*b* and 149*b* of the movable blade module 140 (see FIG. 12) come in contact with the locking parts 115 and 116 of the fixed blade module 110 (see FIG. 8), respectively. This arrangement regulates the rotational position of the movable blade module 140 about the position O3 (i.e., the position of the shaft portions 150*a* and 150*b* engaging the hook parts 128*a* and 128*b*) relative to the fixed blade module 110. The movable blade module 140 is thus placed in such a position in which the movable blade module 140 is rotated further clockwise relative to the fixed blade module 110, compared with the related-art position illustrated in FIG. 3B. As a result, the angle of the movable blade 151 relative to the fixed blade 122 in the cutter unit 180 is made equal to the optimum angle θ0 as illustrated in FIG. 15B.

Namely, the thermal printer module 100 is configured such that the thermal printer module 100 itself controls an angle between the movable blade 151 and the fixed blade 122 in the cutter unit 180.

The points of contact are two locations provided at the opposite ends of the movable blade module 140 on the X1 side and the X2 side, respectively. Accordingly, the rotational position of the movable blade module 140 relative to the fixed blade module 110 is stably determined. That is, the angle between the movable blade 151 and the fixed blade 122 in the cutter unit 180 is stably determined.

[Thermal Printer Apparatus 200]

Figure 16A:
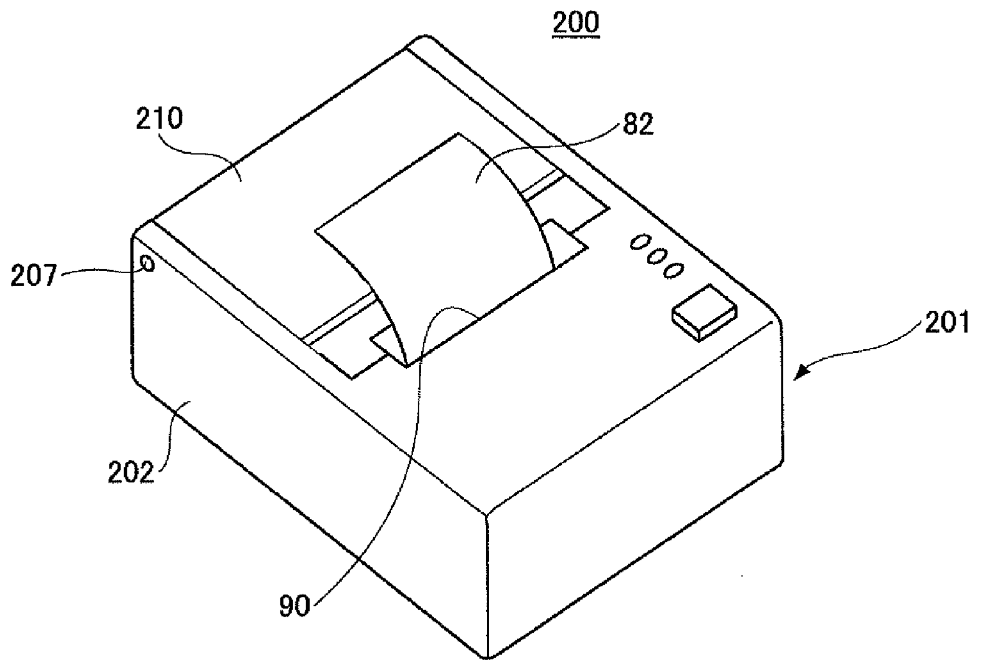
FIGS. 16A and 16B are drawings illustrating a thermal printer apparatus according to the first embodiment of the present invention.
Figure 16B:
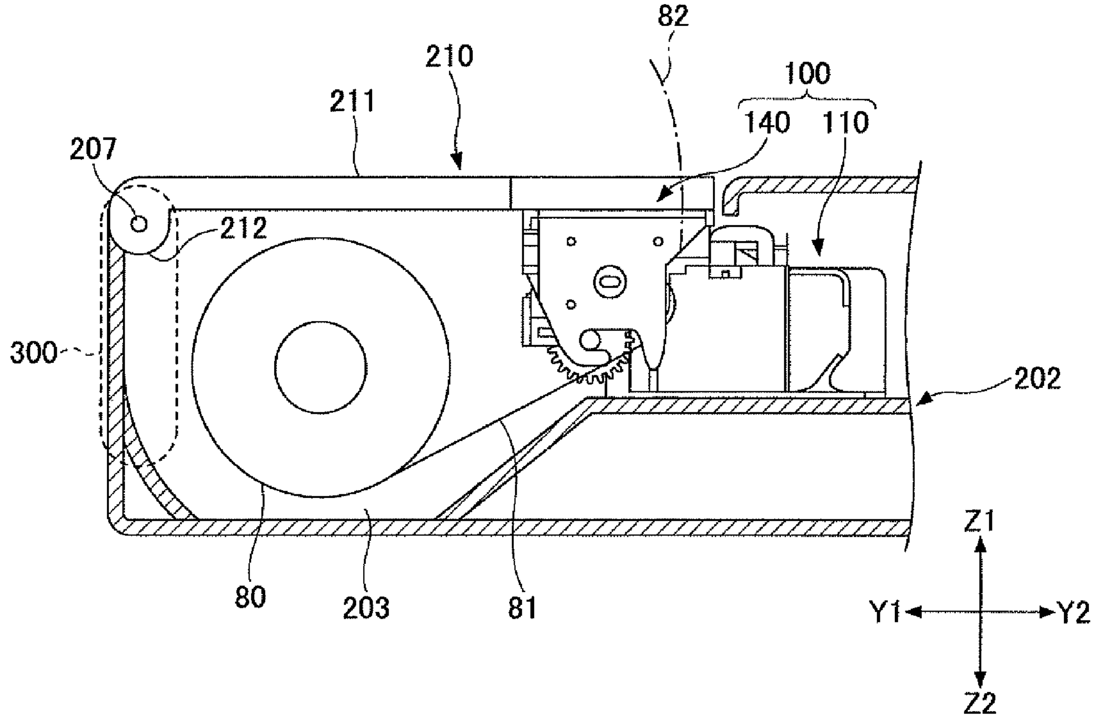
Figure 17A:
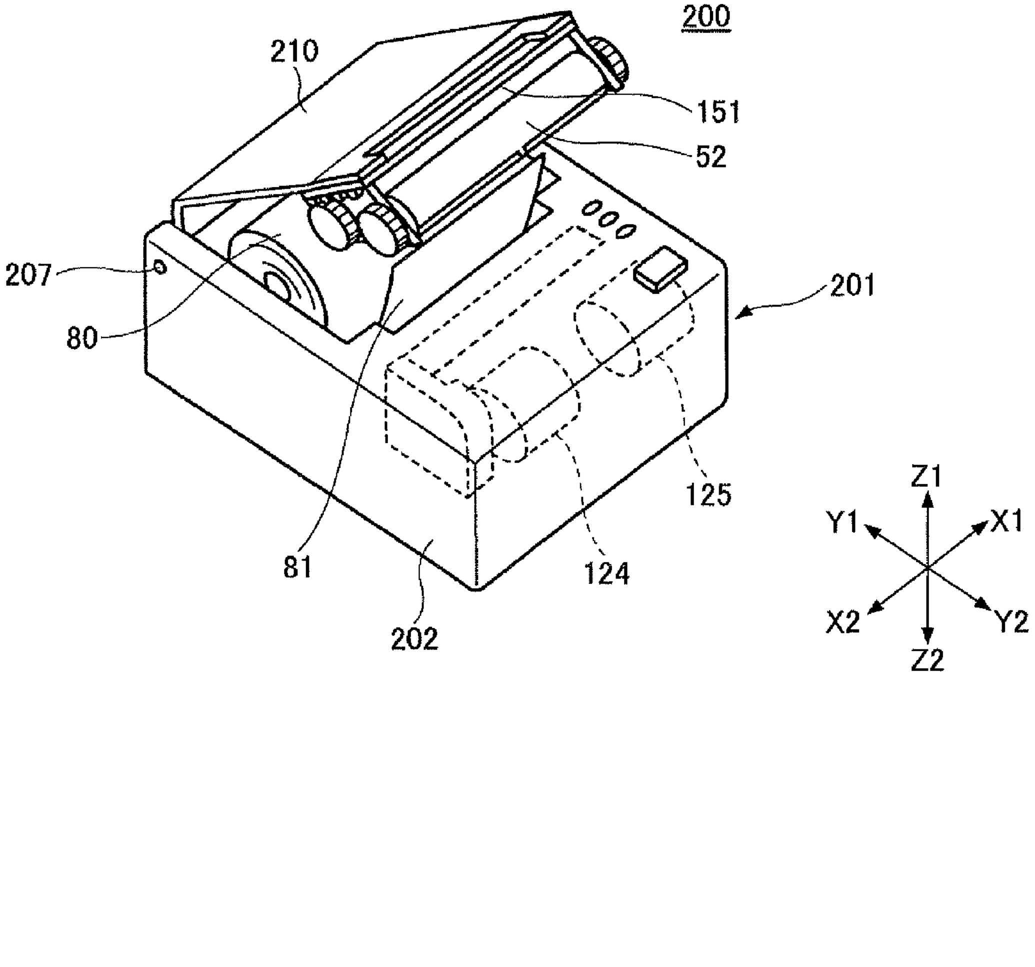
FIGS. 17A and 17B are drawings illustrating a state in which a rotationally openable lid is open.
Figure 17B:
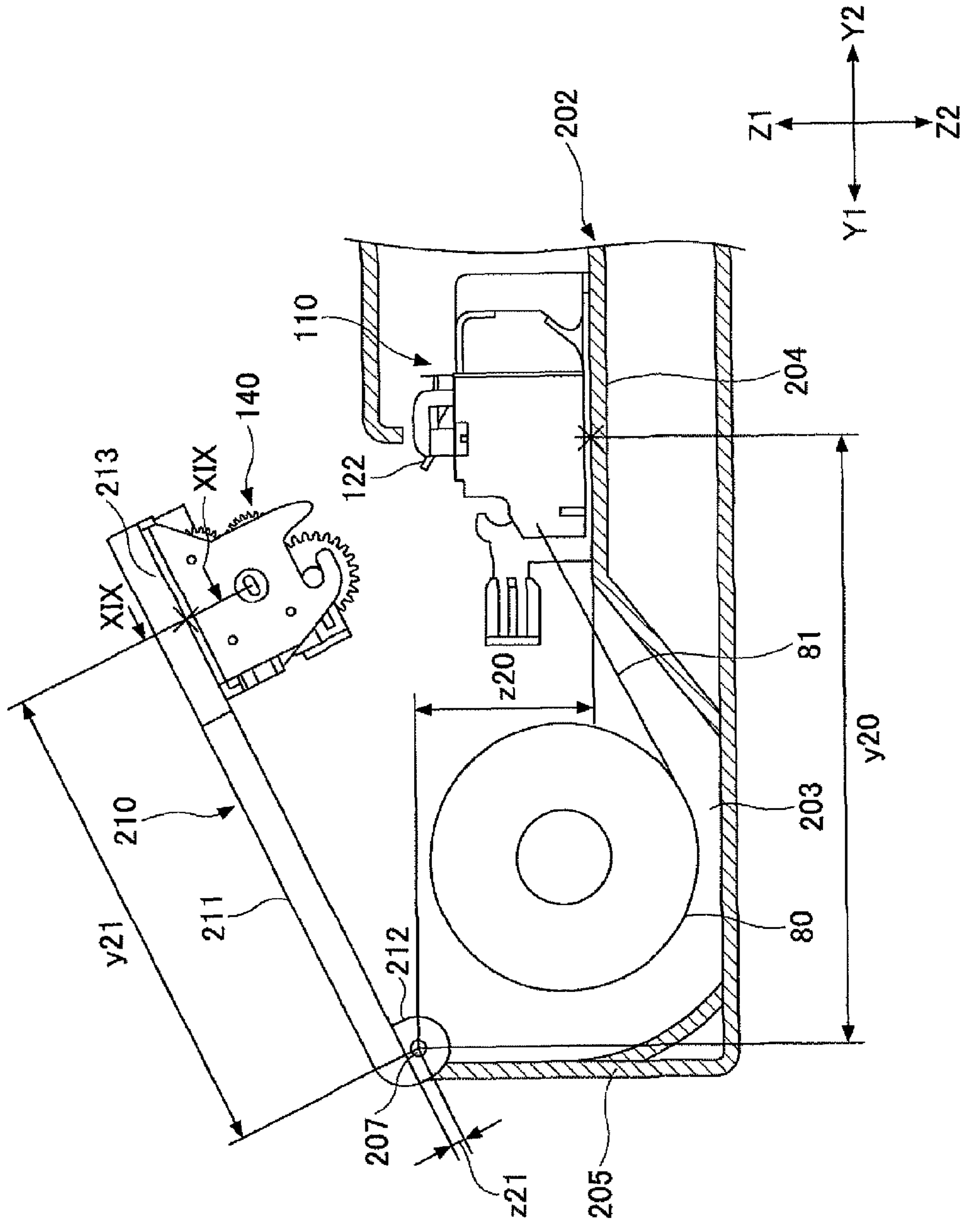

FIGS. 16A and 16B and FIGS. 17A and 17B are drawings illustrating a clamshell-type thermal printer apparatus 200. FIGS. 17A and 17B illustrate the state in which a rotationally openable lid 210 is open, and FIGS. 16A and 16B illustrate the state in which the rotationally openable lid 210 is closed.

The thermal printer apparatus 200 has such a configuration that the thermal printer module 100 is mounted in an apparatus main body 201. The apparatus main body 201 includes a case 202 and the rotationally openable lid 210. The case 202 and the rotationally openable lid 210 are both a molded synthetic resin component.

The case 202 includes a paper roll container part 203 for storing a paper roll 80 and a mounting platform part 204 on which the fixed blade module 110 is mounted. The case 202 further includes a hinge bracket part 205 at an end of the paper roll container part 203.

The rotationally openable lid 210 includes a lid main body 211, a hinge bracket part 212, and a mounting platform part 213. The lid main body 211 has such a size as to cover the paper roll container part 203. The hinge bracket part 212 is provided at the base end of the lid main body 211. The mounting platform part 213 serves as a platform on which the movable blade module 140 is mounted.

The hinge bracket part 212 of the rotationally openable lid 210 is supported by the hinge bracket part 205 via a shaft 207. The rotationally openable lid 210 is opened and closed by rotating about the shaft 207.

The fixed blade module 110 is fixed to the mounting platform part 204 of the case 202 by threadable mounting. The fixed blade module 140 is fixed to the mounting platform part 213 of the rotationally openable lid 210 by threadable mounting as will be described later.

The position of the mounting platform part 204 relative to the shaft 207 (as determined by measurement y20 and measurement z20) and the position of the mounting platform part 213 relative to the shaft 207 (as determined by measurement y21 and measurement z21) are arranged to provide the positional relationship as illustrated in FIGS. 16A and 16B. Namely, the positional relationship is such that the movable blade module 140 is joined to the fixed blade module 110 when the rotationally openable lid 210 is closed by rotating clockwise.

[Structure for Mounting Movable Blade Module 140 to Rotationally Openable Lid 210]

Figure 18:
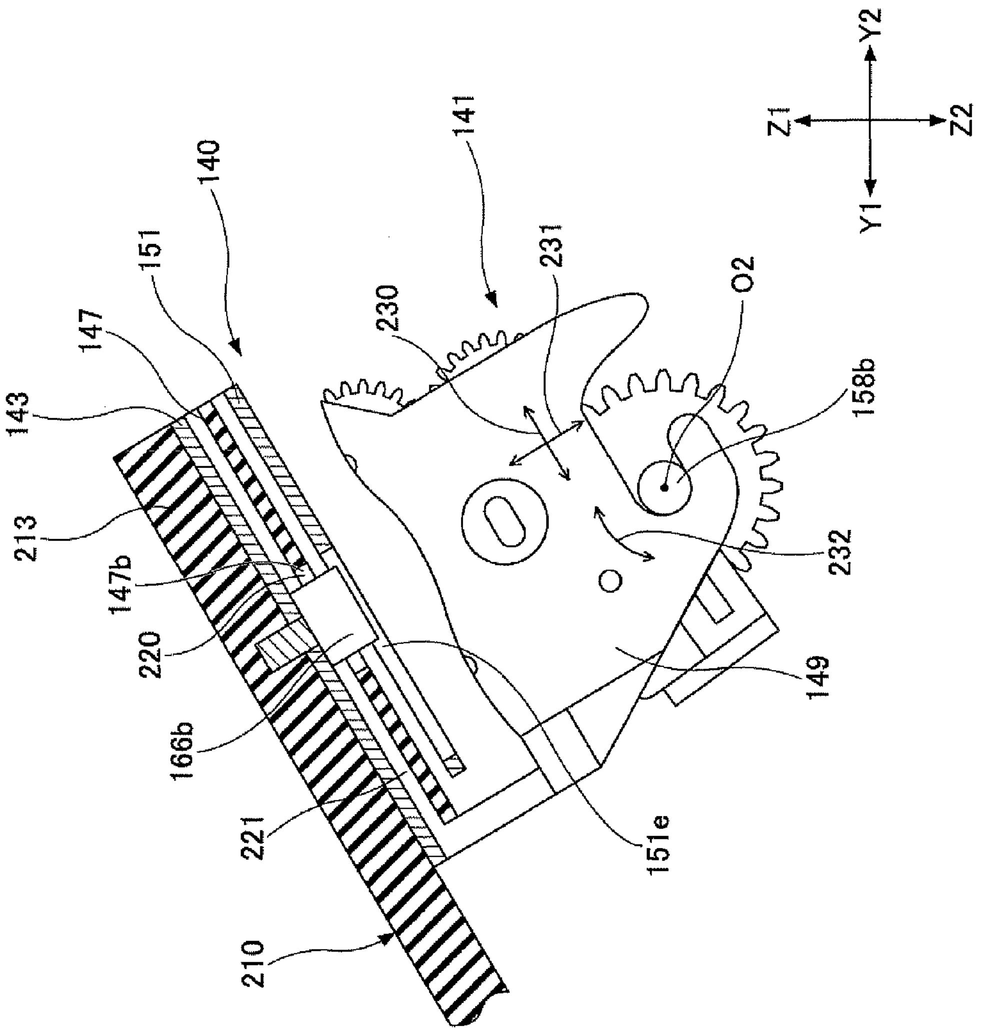
FIG. 18 is an enlarged view of a mounting mechanism that mounts the movable blade module to the rotationally openable lid.
Figure 19:
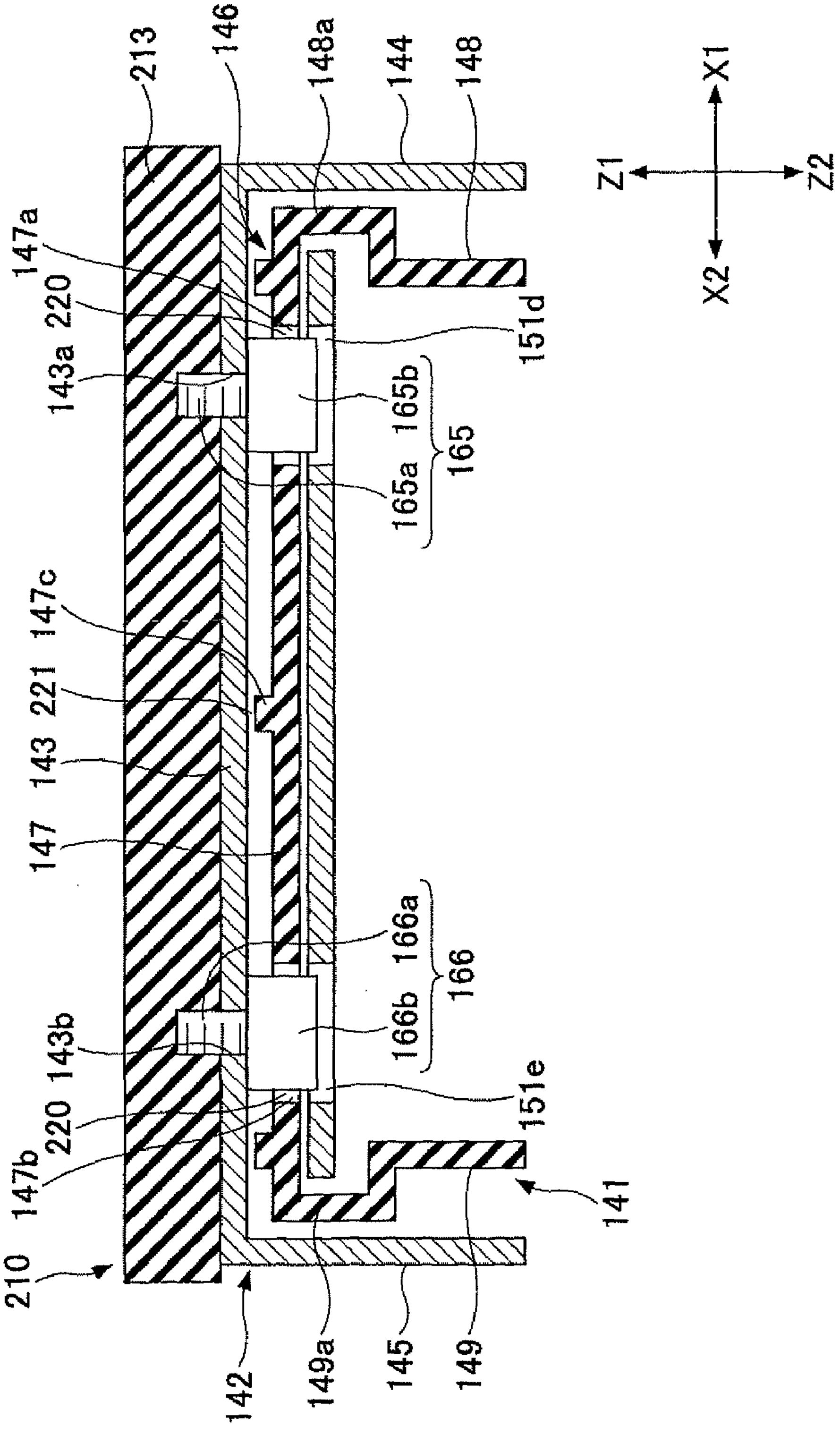
FIG. 19 is an enlarged cross-sectional view of the mounting mechanism that mounts the movable blade module to the rotationally openable lid as taken along a line XIX-XIX shown in FIG. 17B.

As illustrated in enlarged views of FIG. 18 and FIG. 19, the movable blade module 140 is mounted on the mounting platform part 213 by fixing the cover member 142 to the mounting platform part 213 by the screws 165 and 166.

The screws 165 and 166 have thread portions 165*a* and 166*a* and heads 165*b* and 166*b*, respectively.

The openings 147*a* and 147*b* of the top plate 147 of the frame 146 loosely engage the head portions 165*b* and 166*b*, respectively. The gaps 220 of approximately 1 mm are provided on the Y1 and Y2 sides of the head portions 165*b* and

166*b* between the head portions 165*b* and 166*b* and the openings 147*a* and 147*b*, respectively.

Further, the gap 221 is provided between the top plate 147 of the frame 146 and the top plate 143 of the cover member 142.

Accordingly, the movable blade module main body 141 is movable in the longitudinal direction of the rotationally openable lid 210 as indicated by an arrow 230 relative to the mounting platform part 213 of the rotationally openable lid 210 as much as permitted by the gaps 220 and 221. Further, the movable blade module main body 141 is movable in the direction perpendicular to the mounting platform part 213 as indicated by an arrow 231. Moreover, the movable blade module main body 141 is rotationally movable about the position O2 within a small angular range as indicated by an arrow 232.

[State in which Rotationally Openable Lid 50 is Closed]

As the rotationally openable lid 50 is rotated clockwise for closing upon setting the paper roll 80, the movable blade module 140 is brought closer to the fixed blade module 110. Similar to the case of the thermal printer module 100, the platen roller 150 is pressed against the thermal head 123 to form the print unit 170 as illustrated in FIG. 14B. Moreover, the edge of the movable blade 151 is placed in contact with the edge of the fixed blade 122 on the Z1 side thereof to form the cutter unit 180. Moreover, the gear 157 (see FIG. 12) engages an end gear of the speed reduction gear series 127 (see FIG. 8), and the gear 156 (see FIG. 12) engages an end gear of the speed reduction gear series 126 (see FIG. 9). The shaft portions 150*a* and 150*b* of the platen roller 150 (see FIG. 12) engage the hook parts 128*a* and 128*b* of the platen roller lock member 128 (see FIG. 8), respectively, so that the movable blade module 140 is joined to the fixed blade module 110.

The platen roller 150 presses a sheet 81 extending from the paper roll 80 against the thermal head 123.

Upon joining the movable blade module 140 to the fixed blade module 110, the bulging portions 148*b* and 149*b* of the movable blade module 140 (see FIG. 12) come in contact with the locking parts 115 and 116 of the fixed blade module 110 (see FIG. 8), respectively. As this happens, the movable blade module main body 141 is slightly moved relative to the cover member 142 as appropriate. As a result, the angle of the movable blade 151 relative to the fixed blade 122 in the cutter unit 180 is made equal to the optimum angle θ0 as illustrated in FIG. 15B.

Namely, the assembly error of the apparatus main body 201, the positional error of the fixed blade module 110 mounted on the mounting platform part 204, the positional error of the movable blade module 140 mounted on the mounting platform part 213, etc., are absorbed by the slight appropriate movement of the movable blade module main body 141 relative to the cover member 142. As a result, the angle of the movable blade 151 relative to the fixed blade 122 in the cutter unit 180 is made equal to the optimum angle θ0 as illustrated in FIG. 15B without being affected by the above-noted errors.

Upon a print instruction, the thermal head 123 is driven and heated, and, also, the paper shifting pulse motor 124 is driven to rotate the platen roller 150 via the speed reduction gear series 126 and the gear 156. Through this operation, printing is performed with respect to the sheet. A printed sheet portion 82 (see FIGS. 16A and 16B) then comes out through an output 90 upon passing the cutter unit 180.

Upon the completion of printing, a cut instruction is given to drive the cutter-unit pulse motor 125 to drive the racks 154 and 155 via the speed reduction gear series 127, the gear series 152, and the pinions 161 and 162. The movable blade 151 is thus driven to slide in the Y2 direction along the guide portions 148*a* and 148*b*. After this, the cutter-unit pulse motor 125 is driven in a reverse direction to return the movable blade 151 through sliding movement in the Y1 direction. Through these operations, the printed sheet portion 82 is cut.

When the movable blade module 140 is joined to the fixed blade module 110, the angle of the movable blade 151 relative to the fixed blade 122 is set equal to the optimum angle θ0 through the self-alignment functions of the movable blade module 140 and the fixed blade module 110. It follows that the position of the rotation center of the rotationally openable lid 210 relative to the case 202 may freely be selected within a range of an area 300 as indicated by a dotted line in FIG. 16B. Therefore, greater latitude in design is provided for the thermal printer apparatus 200.

Further, the present invention is not limited to these embodiments, but various variations and modifications may be made without departing from the scope of the present invention.

The present application is based on Japanese priority application No. 2009-016443 filed on Jan. 28, 2009, with the Japanese Patent Office, the entire contents of which are hereby incorporated by reference.

What is claimed is:

1. A printer module for use in a printer apparatus having a rotationally openable lid, comprising:

a fixed blade module having a fixed, blade and a locking part; and a movable blade module including a movable blade module main body, a movable blade and a bulging portion formed as a portion of the movable blade module main body, and configured to be joined to the fixed blade module such that the movable blade and the fixed blade face each other, wherein the movable blade module is configured to be movable relative to the rotationally openable lid upon being mounted on the rotationally openable lid; and the bulging portion is positioned relative to the fixed blade, and upon joining the movable blade module to the fixed blade module, the edge of the bulging portion is brought into contact with the locking part such that an angle between the movable blade and the fixed blade is set to a predetermined angle.

2. The printer module as claimed in claim 1, wherein the movable blade module includes:

the movable blade module main body having the movable blade attached thereto; and a mounting member configured to be fixedly mounted on the rotationally openable lid and to engage the movable blade module main body through a loose fit that allows movement of the movable blade module main body relative to the mounting member, and wherein the bulging portion achieves the positioning of the movable blade module relative to the fixed blade module through physical contact with the locking part.

3. The printer module as claimed in claim 1, wherein the fixed blade module includes a fixed blade module frame on which the fixed blade is mounted, and the movable blade module includes a movable blade module frame on which the movable blade is mounted, and wherein the locking part is formed on the fixed, blade module frame and the bulging portion is formed on the movable blade module frame that engages with the locking part upon joining the movable blade module to the fixed blade module.

4. The printer module as claimed in claim 3, wherein the locking part is formed at each of opposite ends of the fixed blade module frame, and the bulging portion is formed at each of opposite ends of the movable blade module frame, wherein the bulging portion formed at each of the opposite ends of the movable blade module frame engages with the locking part formed at each of the opposite ends of the fixed blade module frame upon joining the movable blade module to the fixed blade module.

5. The printer module as claimed in claim 1, wherein the movable blade module includes:

a movable blade module main body including a movable blade module frame on which the movable blade is mounted, the movable blade module frame having a first top plate; and a cover member including a second top plate and flange parts provided at opposite ends of the second top plate, the flange parts engaging with the movable blade module main body in such a manner that the first top plate and the second top plate face each other with a gap provided therebetween, wherein the second top plate of the cover member is configured to be fixed to the rotationally openable lid through threadable mounting by one or more screws, and the first top plate of the movable blade module frame has one or more openings that are larger than heads of the one or more screws.

6. A printer apparatus, comprising:

a case;

a rotationally openable lid that rotatably opens and closes with respect to the case;

a fixed blade module having a fixed blade and a locking part, and mounted on the case; and a movable blade module including a movable blade module main body, a movable blade and a bulging portion formed as a portion of the movable blade module main body, and mounted on the rotationally openable lid, the movable blade module configured to be joined to the fixed, blade module upon closing the rotationally openable lid such that the movable blade and the fixed blade face each other, wherein the movable blade module mounted on the rotationally openable lid is configured to be movable relative to the rotationally openable lid; and the bulging portion is positioned relative to the fixed blade, and upon joining the movable blade module to the fixed blade module, the edge of the bulging portion is brought into contact with the locking part such that an angle between the movable blade and the fixed blade is set to a predetermined angle.

7. The printer apparatus as claimed in claim 6, wherein the movable blade module includes:

the movable blade module main body having the movable blade attached thereto; and a mounting member fixedly mounted on the rotationally openable lid and configured to engage with the movable blade module main body through a loose fit that allows movement of the movable blade module main body relative to the mounting member, and wherein the bulging portion achieves the positioning of the movable blade module relative to the fixed blade module through physical contact with the locking part.

* * * * *